June 24, 1941.  J. M. TYLER ET AL  2,246,704
RESILIENT MOUNTING
Filed March 10, 1939  2 Sheets-Sheet 1
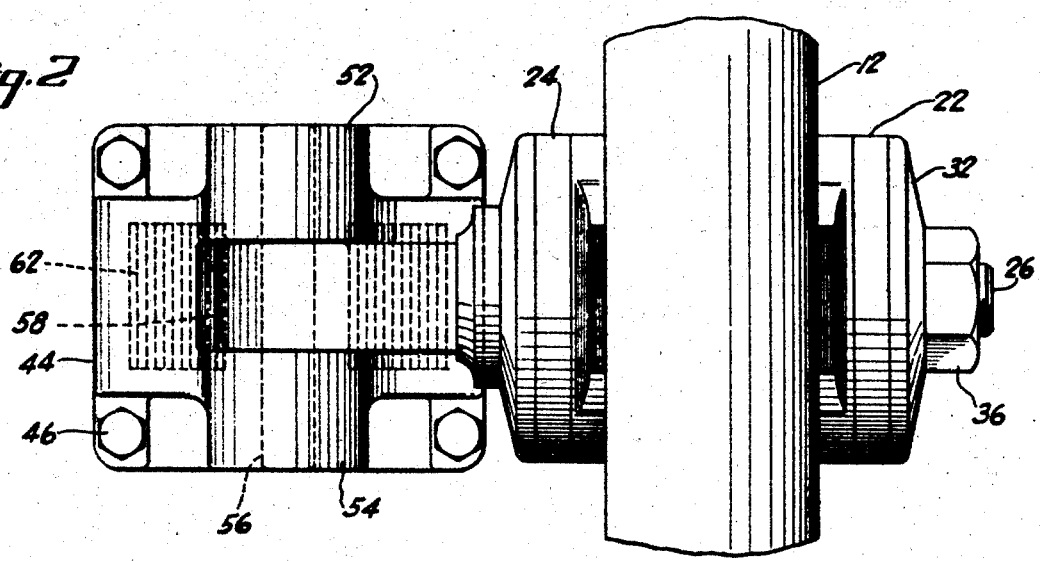
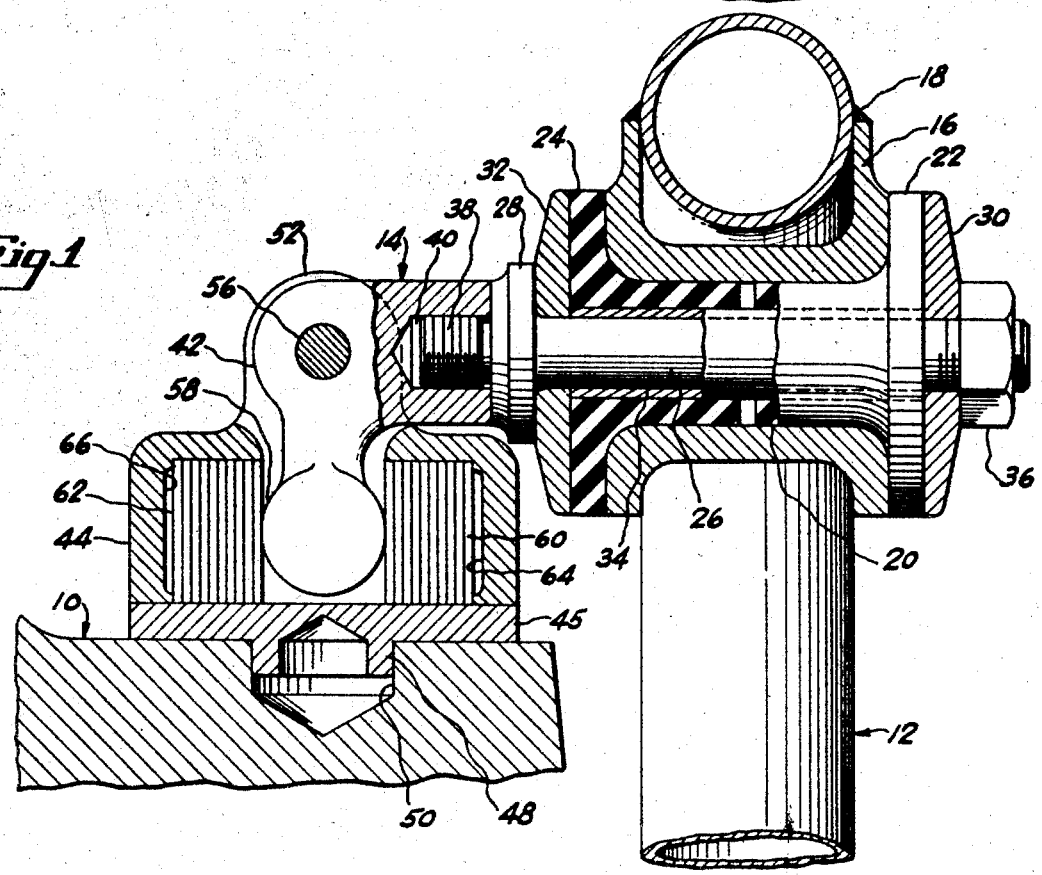
INVENTOR
John M. Tyler
Robert E. McIntosh
BY
Harris G. Luther
ATTORNEY June 24, 1941.  J. M. TYLER ET AL  2,246,704
RESILIENT MOUNTING
Filed March 10, 1939  2 Sheets-Sheet 2
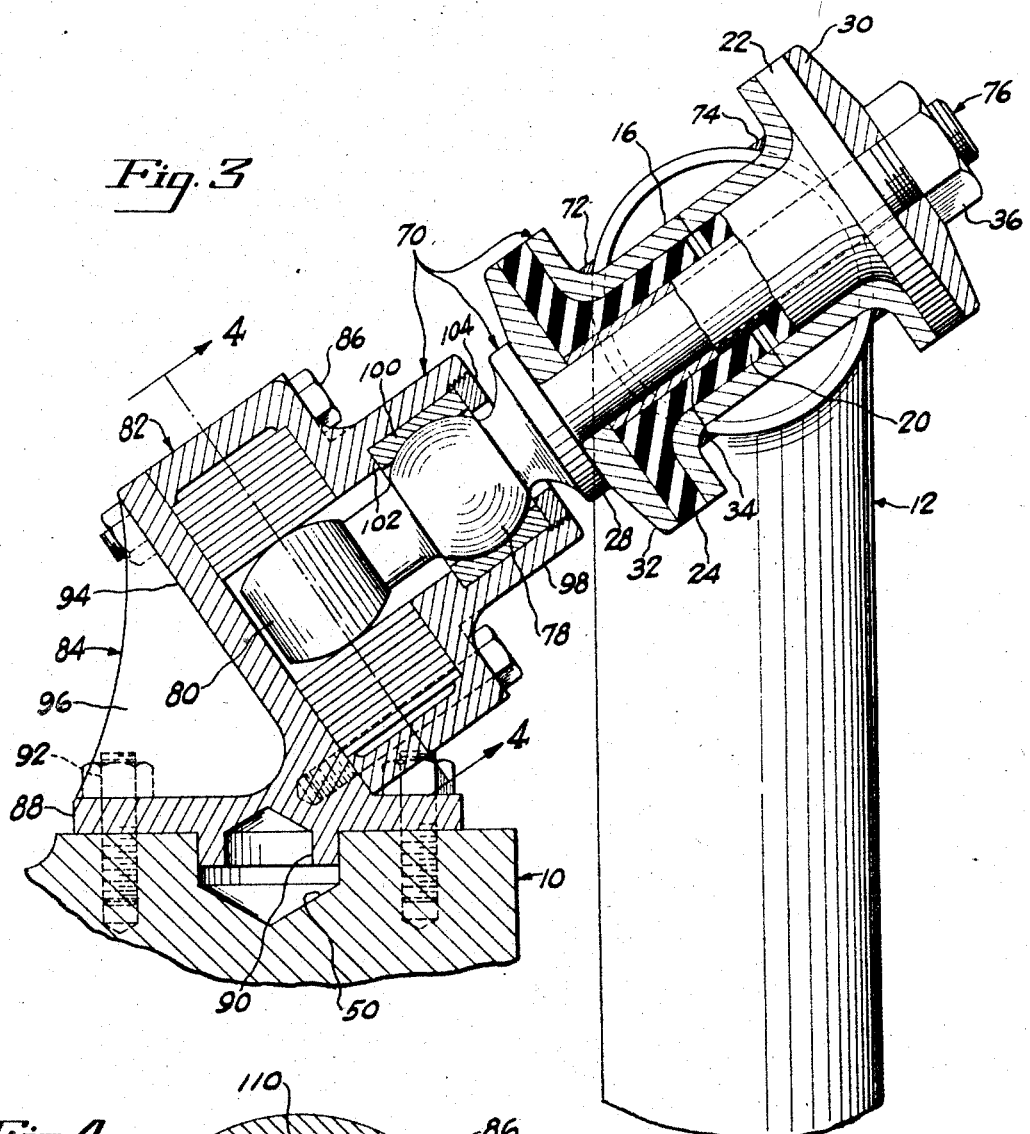
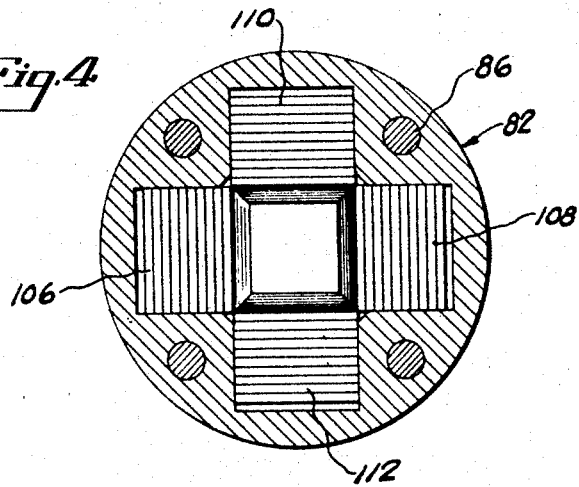
INVENTOR
John M. Tyler
Robert E. McIntosh
BY
Harris G. Luther
ATTORNEY Patented June 24, 1941

2,246,704

UNITED STATES PATENT OFFICE 2,246,704

RESILIENT MOUNTING

John M. Tyler, West Hartford, and Robert E. McIntosh, Manchester, Conn., assignors to United Aircraft Corporation, East Hartford, Conn., a corporation of Delaware Application March 10, 1939, Serial No. 261,112

8 Claims. (Cl. 248—5)

This invention relates to improvements in resilient mounting brackets for vehicle engines, and has for an object the provision of an improved mounting bracket construction including means providing a limited, resiliently resisted, freedom of movement between a vehicle engine and its support, and means for damping such resiliently resisted movements.

A further object resides in the provision of improved mounting brackets providing cushions of resilient material sufficiently elastic to suppress the transmission of engine vibration from the engine to the vehicle but which will, at the same time, provide an engine support with sufficient damping to prevent excessive vibration of the engine relative to its supports when excited at the resonance of the engine on its supports.

A still further object resides in the provision of a resilient engine mounting bracket construction having a spring rate so selected or adjusted that the spring rate frequency will not be in resonance with the frequency of a major vibrational disturbance in the ordinary operating speed range of the engine.

A somewhat more specific object resides in the provision of improved resilient engine mounting brackets each including a resilient cushion of rubber or some similar resilient material and a spring pack cushion in series with each other.

Other objects and advantages will be more particularly pointed out hereinafter or will become apparent as the description proceeds.

In the accompanying drawings, in which like reference numerals are used to designate similar parts throughout, there is illustrated in two somewhat different forms a suitable mechanical embodiment of a resilient engine mounting bracket constructed according to the invention. The drawings, however, are for the purpose of illustration only and are not to be taken as in any way limiting or restricting the scope of the invention as set forth in the appended claims.

In the drawings, Fig. 1 is a vertical sectional view of one form of resilient engine mounting bracket constructed according to the invention and includes fragmentary portions of the engine and the engine supports to which the bracket is attached.

Fig. 2 is a top plan view of the bracket illustrated in Fig. 1.

Fig. 3 is a sectional view similar to Fig. 1 showing a somewhat modified form of resilient engine mounting bracket, and Fig. 4 is a transverse sectional view taken on the line 4—4 of Fig. 3 looking in the direction of the arrows.

Referring to the drawings in detail, and particularly to Figs. 1 and 2, the numeral 10 generally indicates an engine, such as a radial internal combustion engine commonly used for the propulsion of aircraft, and the numeral 12 generally indicates a portion of the vehicle serving as a support for the engine. Such a support may be in the form of an annular tubular ring attached to the aircraft by a suitable strut or frame construction. The illustrated portion of the engine is a substantially circular component such as the engine blower or supercharger section and is made sufficiently strong to transmit the weight of the engine and the reaction to the power developed by the engine to the ring 12 through the mounting brackets.

One form of the complete mounting bracket assembly is generally indicated by the numeral 14. While actually a number of brackets are disposed about the circumference of the ring 12 and bracket carrying portion of the engine 10, angularly spaced apart in a manner which has been found most satisfactory for supporting the engine weight and transmitting the reaction to the engine power to the mounting ring, as the brackets in each installation are all similar, a detailed description of only one bracket of each form is considered sufficient for the purpose of this disclosure. Each bracket consists essentially of three elements, namely, a portion rigidly attached to the ring 12, a portion rigidly attached to the engine 10, and a portion connecting the ring and engine portions, as will appear more clearly from the following detailed description.

In the form shown in Figs. 1 and 2, a flanged sleeve member 16 is rigidly attached to the mounting ring 12, preferably by welding as indicated at 18, and is disposed within the ring. A two part rubber bushing 20 provided with enlarged end flanges, as indicated at 22 and 24, is inserted in the sleeve member 16 so that the end flanges 22 and 24 overlie the end flanges of the sleeve member. A bolt 26, provided at one end with an annular shoulder 28 is inserted through the bushing 20 and through a pair of apertured washers 30 and 32 disposed one at each end of the bushing 20 and having diameters substantially the same as the diameters of the respective bushing ends 24 and 22. A tubular spacer 34 surrounds the portion of the bolt 26 within the bushing 20 and bears at its ends against the inner faces of the washer members 30 and 32 to limit the compression of the bushing flanges 22 and 24 by the washer members when the nut 36 is screwed down on the screw threaded end of the bolt 26 opposite the shoulder 28. On the opposite side of the shoulder 28 from the bushing receiving portion, the bolt 26 is provided with a screw threaded end portion 38 which is threaded into an internally threaded well 40 in one end of a bell crank lever 42. A hollow metal box-like structure 44 is secured upon a plate 46 which is, in turn, secured to the surface of the bracket receiving portion of the engine by suitable means, such as the cap screws 46, which pass through apertured flange portions provided on the box-like structure 44 and apertures in the plate 46 and into internally screw threaded bores provided in the bracket receiving portion of the engine. The plate 46 is provided on its engine contacting surface with a circular centering lug 48 which projects into a circular well 50 provided in the bracket receiving portion of the engine to relieve the cap screws 46 of a portion of the shear loads transmitted through this connection of the bracket to the engine. On its side opposite the bracket receiving portion of the engine, the member 44 is provided with a pair of upstanding, spaced apart, apertured lugs 52 and 54 which receive the ends of a pivot pin 56 which passes through the intermediate portion of the bell crank member 42 to pivotally connect the bell crank member to the structure 44.

At its end opposite the bolt receiving well 40 the bell crank member 42 is provided with a partly cylindrical portion 58 disposed between opposed spring packs 60 and 62 received in respective spring pack receiving cavities 64 and 66 provided in the interior of the hollow member 44. The spring packs 60 and 62 are preferably preloaded to a predetermined extent.

With this arrangement, if the engine moves out of axial coincidence with the mounting ring or tilts with respect to the mounting ring the bolts 26 will be tilted out of their normal coaxial relationship with the respective sleeves 16, due to the compressibility of the rubber bushings 20, and the bell crank levers 42 will consequently be tilted about the respective pivot pins 56. In each case this movement of the bell crank will move the respective cylindrical ends 58 between the spring packs 60 and 62, increasing the loading on one spring pack and proportionately reducing the loading on the opposed spring pack. Such movements of the ends 58 will be resisted both by the resiliency of the spring packs and by the friction produced between the various spring elements when the shape of the spring pack is changed. A portion of the energy imparted to the spring packs will be returned to the bell crank member by the resiliency of the spring elements but a large portion of such energy will be absorbed in the friction losses of the spring packs and converted into heat thereby materially reducing the amplitude of the movement of the bolt and bell crank assembly with respect to the bushing 16 and structure 44 with a consequent damping effect on the movement of the engine relative to the mounting ring. The spring packs will thus prevent transmission of so called low frequency vibrations and the rubber bushing will act as a vibration insulating bushing preventing transmission of so called high frequency vibrations including those in the sound range.

In the form of the invention shown in Figs. 3 and 4 the entire mounting bracket assembly, generally indicated at 70, is mounted in such a manner that its longitudinal axis makes an acute angle with the common axis of the engine 10 and mounting ring 12. Preferably the axes of all of the mounting brackets, spaced about the mounting ring, intersect the longitudinal axis of the engine at a common point which point is preferably ahead of the center of gravity of the engine. In the modified form of the invention the sleeve 16 may be disposed within the inner circumference of the ring 12 or may be made in two separate parts inserted through suitable apertures in the ring to meet within the ring to provide a complete sleeve as illustrated, and may be secured to the ring by suitable weld joints as indicated at 72 and 74. A bolt, generally indicated at 76, extends through the sleeve 16 and a two part insulating rubber bushing 20 is disposed between the bolt and the sleeve in the manner described above. A spacer sleeve 34 immediately surrounds the bolt inside of the rubber bushing. The bushing is provided with end flanges 22 and 24 which are sandwiched between the outturned ends of the sleeve 16 and the respective washers 30 and 32 clamped between the enlarged shoulder 28 provided on the bolt intermediate its length and the nut 36 screw threaded upon the end of the bolt at the remote side of the sleeve 16 from the shoulder 28. This construction provides a flexible mounting for the bolt 76 in the sleeve 16 which is rigidly connected to the support 12 so that the bolt may move in all directions to a limited extent with respect to the sleeve, all such movements of the bolt with respect to the sleeve being resiliently resisted by the rubber bushing 20. In some installations it has been found desirable to arrange the bolt retaining means so that the bolt may move easier in some directions than in others. For this purpose the thickness of the flange portions 22 and 24 may be controlled in proportion to the thickness of the portion between the flanges, and the portion between the flanges may be made thicker in some directions than in others and, if desired, may be further softened by providing apertures therethrough. With such a construction the mounting can be made quite soft in a circumferential or torsional direction and relatively rigid in the radial and axial directions, or relatively soft in the direction along the axes of the bolts 76 and relatively rigid in other directions, as may be desired.

A portion of the bolt on the opposite side of the shoulder 28 from the part received in the sleeve 16 is provided with a partly spherical enlargement 78 and a terminal portion 80 having four substantially semicylindrical edges spaced from the enlargement 78 by a predetermined distance. The enlargements 78 and 80 are both received in a hollow housing generally indicated at 82, secured to a pedestal 84 by suitable means, such as the screw bolt 86. The pedestal has a base plate 88 provided with a centering plug 90 received in the respective well 50 and is rigidly secured to the engine by suitable means such as the stud bolts 92. The pedestal also has a plate 94 disposed at an angle to the plate 88 to receive the open end of the housing 82 to which it is secured by the bolts 86. The plates 88 and 94 are integral with each other and with one or more reinforcing webs, as indicated at 96.

The enlargement 78 is received in an annular extension 98 of the housing 82 and is retained therein by a split annular bearing 100 clamped against an internal shoulder 102 by a nut 104 so that the bolt has a universal mounting in the housing and is restrained rigidly only against axial or longitudinal movements with respect to the housing.

The bolt is movable in all three planes in the flexible bushing 20 and it has been found desirable to damp these movements in at least two planes. With this end in view two pair of diametrically opposed spring packs are arranged in the housing around the terminal enlargement 86, the spring packs of one pair being indicated by the numerals 106 and 108 and of the other pair by the numerals 110 and 112. This arrangement provides damping for all movements of the bolt 76 about the universal mounting including the partly spherical enlargement 78 and the bearing 100. That it does not provide damping for strictly longitudinal movements of the bolt through the sleeve 16 is not important since such movements are rare and relatively inconsequential because of the angular arrangement of the mounting bracket. Most vibratory movements of the engine take place about the center of gravity of the engine and the center of gravity of the engine does not itself ordinarily move. Therefore, since the prolongations of the axes of all of the bolts 76 intersect near the center of gravity of the engine, there will be no material vibration induced longitudinal movements of the bolts through the bushing retaining sleeve but such movements will nearly always be transversely of the sleeve and of the housing 82. Movements of the entire engine due to gravitational effects are relatively slow and may be properly cushioned by correctly designing the bushing flanges 22 and 24.

The spring packs 106, 108, 110 and 112 are preferably preloaded to a predetermined extent and serve to control the movements of the engine relative to its supports by damping the movements permitted by the resiliency of the rubber bushing so that, even if the frequency of a particular vibration should get into resonance with the natural frequency of the engine and its supports, the movements of the engine relative to its supports could never become excessive as might be the case with an undamped mounting.

While two slightly different mechanical embodiments of the invention have been hereinabove described and illustrated in the accompanying drawings for the purpose of disclosing the invention, it is to be understood that the invention is not limited to the particular constructions so illustrated and described, but that such changes in the size, shape and arrangement of parts may be resorted to as come within the scope of the sub-joined claims.

Having now described the invention so that others skilled in the art may clearly understand the same, what it is desired to secure by Letters Patent is as follows:

1. A mounting bracket for securing an engine to an engine support comprising, a support attached element, an engine attached element, a link connecting said elements, a resilient high frequency insulating connection between said link and said support carried element, a pivotal connection between said link and said engine attached element, and means comprising at least one pair of opposed spring packs carried by said engine attached element, and a projection on said link extending between said spring packs for frictionally damping movements of said link about said pivotal connection and preventing transmission of low frequency vibrations.

2. A mounting bracket for securing an engine to an engine supporting ring comprising, a ring attached element, a hollow engine attached element, a link connecting said elements, a resilient connection between said link and said ring attached element, a pivotal connection between said link and said engine attached element, and means comprising a pair of opposed spring packs disposed in said hollow engine attached element, and a right angular projection on said link extending into said hollow engine attached element and between said opposed spring packs for frictionally damping movements of said link about said pivotal connection.

3. A mounting bracket for securing an engine to an engine supporting ring comprising, a ring attached element, an engine attached element, a link connecting said elements, a resilient connection between said link and said ring attached element, a pivotal connection between said link and said engine attached element, and means comprising a pair of opposed spring packs carried by said engine attached element and preloaded to a predetermined extent, and a right angular projection on said link extending between said opposed spring packs for frictionally damping movements of said links about said pivotal connection.

4. A mounting bracket for securing an engine to an engine support comprising, a sleeve element on said support, a hollow receptacle having a pair of spaced appertured lugs on said engine, a bolt constituting a portion of a link connecting said sleeve with said receptacle extending through said sleeve, rubber bushings between said sleeve and said bolt, a bell crank constituting the remainder of said link pivotally connected intermediate its length to said appertured lugs, a pair of opposed preloaded spring packs in said receptacle, and a rounded enlargement on the end of said bell crank received between said spring packs.

5. A mounting bracket for securing an engine to an engine supporting ring comprising, a sleeve attached to said ring, a hollow receptacle having a pair of spaced appertured lugs attached to said engine, a bolt extending through said sleeve and constituting a portion of a link for connecting said engine attached receptacle to said sleeve, a pair of washers on said bolt one at each end of said sleeve, rubber pads between said bolt and said sleeve and between said washers and the ends of said sleeve to provide a limited freedom of movement of said bolt in said sleeve, a bell crank pivotally secured to the spaced appertured lugs of said engine receptacle and connected at one end to the adjacent end of said bolt, and a pair of preloaded opposed spring packs in said hollow receptacle receiving between them the end of said bell crank opposite said bolt connected end.

6. Means for attaching an engine to an engine support comprising, a plurality of engine attached elements arranged in spaced annular relation about the axis of rotation of said engine, a plurality of support connected elements annularly disposed about said axis of rotation and so spaced that one support connected element is opposed to each engine attached element and disposed radially outward with respect thereto, a straight link connecting each pair of opposed elements, a cushion of resilient material between one end of each link and the adjacent element of the respective pair, and a universal joint and a frictional damping means between the opposite end of each link and the other element of the respective pair.

7. A resilient engine mounting bracket comprising, a sleeve, a housing, a link projecting at one end through said sleeve and at the other end into said housing, a bushing of resilient material between said link and said sleeve, a universal connection between said link and said housing, a terminal enlargement on said link beyond said universal connection from said sleeve received end, and a plurality of spring packs in said housing surrounding said terminal enlargement.

8. A resilient engine mounting bracket comprising, a sleeve, a housing, a link projecting at one end through said sleeve and at the other end into said housing, a bushing of resilient material between said link and said sleeve, a pivotal connection between said link and said housing, a terminal enlargement on said link beyond said pivotal connection from said sleeve received end, and spring packs in said housing disposed on opposite sides of said terminal enlargement.

JOHN M. TYLER.
ROBERT E. McINTOSH.